US012509332B2

United States Patent

(12) United States Patent
Eberhardt et al.

(10) Patent No.: US 12,509,332 B2
(45) Date of Patent: Dec. 30, 2025

(54) MOBILE CRANE HAVING A COUNTERWEIGHT DEVICE

(71) Applicant: Liebherr-Werk Ehingen GmbH, Ehingen/Donau (DE)

(72) Inventors: Lars Eberhardt, Staig (DE); Peter Scheffold, Ochsenhausen (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 310 days.

(21) Appl. No.: 18/164,156

(22) Filed: Feb. 3, 2023

(65) Prior Publication Data

US 2023/0294964 A1 Sep. 21, 2023

(30) Foreign Application Priority Data

Mar. 15, 2022 (DE) ..................... 10 2022 105 934.0

(51) Int. Cl.
*B66C 23/74* (2006.01)

(52) U.S. Cl.
CPC .................................... *B66C 23/74* (2013.01)

(58) Field of Classification Search
CPC . B66C 23/74; B66C 23/72; E02F 9/18; B66F 9/07554; B62D 49/085
See application file for complete search history.

(56) References Cited

U.S. PATENT DOCUMENTS 12,187,586 B2 * 1/2025 Eberhardt ............... B66C 23/74
2006/0103125 A1 * 5/2006 Yamamoto ........... B62D 49/085 280/760
2015/0246795 A1 * 9/2015 Copeland ............... B66C 23/74 212/197
2018/0022586 A1 * 1/2018 Koenig ................... B66C 23/84 212/197
2018/0057323 A1 * 3/2018 Mebus .................... B66C 23/74
2023/0183047 A1 * 6/2023 König ..................... B66C 23/74 212/195

FOREIGN PATENT DOCUMENTS

CN 101624165 B 6/2011
CN 106698213 A * 5/2017 ............. B66C 23/72
DE 102015013488 A1 5/2016
DE 202021106818 U1 5/2022

* cited by examiner

*Primary Examiner* — Anna M Momper
*Assistant Examiner* — Nathaniel L Adams
(74) *Attorney, Agent, or Firm* — McCoy Russell LLP

(57) ABSTRACT

The disclosure relates to a mobile crane that comprises a travelable undercarriage, a superstructure rotatably supported on the undercarriage, and a counterweight device couplable to the superstructure. The counterweight device comprises a counterweight base plate and at least one connection means for raising the counterweight device and for coupling it to the superstructure. The disclosure furthermore relates to a counterweight device for a mobile crane in accordance with the disclosure.

16 Claims, 8 Drawing Sheets

MOBILE CRANE HAVING A COUNTERWEIGHT DEVICE

CROSS REFERENCE TO RELATED APPLICATION

The present application claims priority to German Patent Application No. 10 2022 105 934.0 filed on Mar. 15, 2022. The entire contents of the above-listed application are hereby incorporated by reference for all purposes.

TECHNICAL FIELD

The present disclosure relates to a mobile crane and to a counterweight device for such a mobile crane.

BACKGROUND

Mobile cranes typically have an undercarriage with a wheeled chassis or a crawler chassis, a superstructure supported rotatably about a vertical axis on the undercarriage, a boom pivotably attached to the superstructure, and a counterweight device also called superstructure ballast. The counterweight produces a counter torque to the load torque via a lever arm in every position of the superstructure and therefore rotates along with the superstructure.

Whereas smaller mobile cranes frequently also take along all the equipment articles for deployment on the construction site in public road traffic as co-called taxis cranes, larger mobile cranes are, however, not able to do this so that it is necessary to dismantle crane components, and in particular the counterweight device, fully or partially for transport in public road traffic and to assemble them on site. The counterweight device typically also has to be dismantled for transport and installed on the superstructure at the deployment site with crawler cranes.

It is therefore known from the prior art to provide a carrier plate or a counterweight base plate having connection means for a releasable connection to the superstructure on which carrier plate or counterweight base plate a plurality of counterweight elements can be stacked. The superstructure is provided with a ballasting device that is able to take up the counterweight device comprising the base counterweight plate and the counterweight elements stacked thereon at the connection means from the ground or from a placement zone on the undercarriage and to lift it onto the superstructure for the installation. The counterweight base plate having the counterweight elements again can be placed on the ground or on the undercarriage for dismantling.

For this purpose, the ballasting device typically comprises one or more hydraulic ballasting cylinders that extend downwardly, that are brought into engagement with the connection means of the counterweight device, and that lift the counterweight device onto the superstructure by retracting.

SUMMARY

Cylindrical reception pipes that are welded to the counterweight base plate and project perpendicularly upwardly therefrom are inter alia used as connection means in the prior art. The counterweight elements have corresponding recesses through which the reception pipes project so that the ballasting cylinders can be brought into contact with the reception pipes from above in the stacked state, for example in combination with a rotational movement of the superstructure. Such reception pipes are exposed to high loads and in some cases considerable shear forces in crane operation and therefore typically have stiffening elements in the form of metal stiffening plates that are welded to the counterweight base plate and to the reception pipe. Instead of cylindrical reception pipes, flat connection means can also be used that likewise frequently have corresponding stiffening portions to be able to reliably withstand shear forces occurring on an inclination or when cornering.

The connection of the counterweight device to the superstructure generally represents a challenge—not least due to the considerable weight of the counterweight device and the dynamic forces that sometimes occur in crane operation. On the one hand, the counterweight device thus has to be held in a secure and stable manner at the superstructure. It is known for this purpose, for example, that the ballasting cylinders hold the counterweight device at the superstructure during crane operation. On the other hand, the connection of the counterweight device to the superstructure should be able to be carried out in an uncomplicated and fast manner.

Consequent to this need, it is the underlying object of the present disclosure to provide a counterweight device for mobile cranes of the category that can be fastened to the superstructure in a simple and secure manner. In this respect, in particular a smooth and fast positioning of the counterweight device at the superstructure should be ensured.

This object is satisfied in accordance with the disclosure by a mobile crane and by a counterweight device. Advantageous embodiments of the disclosure result from the dependent claims and from the following description.

On the one hand, a mobile crane is accordingly proposed that comprises a travelable undercarriage, a superstructure rotatably supported on the undercarriage, and a counterweight device couplable to the superstructure. A boom, for example a telescopic boom, is furthermore in particular luffably connected to the superstructure in an articulated manner. The counterweight device comprises a counterweight base plate and at least one connection means for raising the counterweight device and for coupling the counterweight device to the superstructure. The at least one connection means is connected to the counterweight base plate and extends substantially perpendicular to the counterweight base plate.

In accordance with the disclosure, the at least one connection means comprises a placement area via which the counterweight base plate lies on the connection means at least in the absence of an inclination of the mobile crane and introduces its weight force into the connection means. The placement area can here be a contiguous area or a plurality of partial areas. The placement area or the optional plurality of partial areas can comprise flat and/or chamfered and/or curved regions. Two placement areas are optionally provided on oppositely disposed sides of the connection means. The counterweight base plate can thereby be supported in a stable manner on the connection means.

In accordance with the disclosure, the at least one connection means further comprises a centering means by means of which the counterweight device can be positioned on the superstructure in an installation position. The centering means here in particular interacts with a counter-centering means at the superstructure of the mobile crane and provides an automatic positioning of the counterweight device, in particular during the raising to the superstructure. The centering of the counterweight device in a provided installation position on the superstructure facilitates its attachment.

The at least one connection means furthermore comprises in accordance with the disclosure a fastening means via which the counterweight device is releasably connectable to the superstructure in the installation position. The counterweight device is therefore not held, at the superstructure by one or more ballasting cylinders, for instance during crane operation, but a dedicated releasable connection on the superstructure is rather provided that is established via the fastening means of the at least one connection means and in particular via corresponding fastening means at the superstructure. The counterweight device can thereby be fastened to the superstructure in a secure and stable manner so that any ballasting cylinders provided are relieved after the lifting and fastening.

The connection means in accordance with the disclosure thus satisfies a multiple function: on the one hand, it serves the lifting and placing down of the total counterweight device and, on the other hand, provides a correct positioning of the counterweight device on the superstructure for the purpose of establishing a releasable connection. The at least one connection means likewise takes over the latter function, namely the fastening of the counterweight device to the superstructure, via its fastening means. The at least one connection means thus represents a tensile element, a centering element, and a fastening element in one, which reduces the number of components and facilitates the operation. All of these functions are here optionally combined in a single unit, in particular without any assemblies welded on in a complex manner.

Provision is made in a possible embodiment that the at least one connection means is formed in one piece. Weld connections to be established in a complex manner to other construction elements are thereby omitted, which facilitates the production process. The placement area is here part of the one piece connection means, just like the centering means and the fastening means.

The at least one connection means is optionally configured as a single piece metal sheet design having an in particular substantially flat shape. Such a metal sheet design can be produced more simply than, for example, a cylindrical reception pipe and can be produced with a suitable thickness to withstand the different loads that act along and transversely to the longitudinal axis. The at least one connection means can optionally be produced as a flame-cut part from a thick metal sheet that is easy to obtain, is cheap, and offers large tolerances. The contour can be flame-cut and machined at some parts.

Most mobile cranes work in a supported state. In this respect, the inclination of the axis of rotation of the superstructure about the undercarriage is typically defined and very small. However, mobile cranes also work in an unsupported state. Rough terrain cranes on wheeled chassis or crawler cranes can be named here, for example, that travel in a very mobile manner on tracks that have not been highly developed and move loads by traveling the entire mobile crane. If an inclination occurs with such mobile cranes, the at least one connection means of the counterweight device then experiences a lateral force or a shear force.

Cornering must also be observed here. The counterweight device thus experiences dynamic loads while driving. These forces act on the counterweight base plate and on the counterweight elements that may be stacked thereon when cornering and are transmitted to the superstructure via the connection means. The loads that occur are sometimes very large due to the typically large distance of the ballast center of gravity (masses of the counterweight base plate and of the counterweight elements) from the bearing points (i.e. the connections of the connection means at the superstructure and/or of the connection means to the counterweight base plate).

In mobile cranes known from the prior art, stiffening portions are therefore necessary that support the connection means in sheet metal form. These supports cause complicated geometries of the counterweight base plate and/or of the counterweight elements that have to be provided with corresponding recesses through which the connection means project together with the stiffening portions or supports in the connected state. If the connection means are welded to the upper side of the counterweight base plate, the weld connections additionally have to be established in a correspondingly complex loadable manner.

With the counterweight device in accordance with the disclosure, the counterweight base plate advantageously lies on the at least one connection means via the placement area. A very stable connection, that is uncomplicated in comparison with the stiffening solution, can thereby be provided between the connection means and the counterweight base plate. This connection can be designed in various manners.

Provision is accordingly made in a further possible embodiment that the at least one connection means is fixedly connected in particular welded, to the counterweight base plate. The connection means is here optionally fixedly, i.e. immovably, supported, in a recess of the counterweight base plate, with the placement area of the connection means being located within the recess and being contacted by the counterweight base plate. The counterweight base plate therefore also lies on the connection means via the placement area in the fixedly connected state. The connection between the connection means and the counterweight base plate, in particular the weld seam, is configured here such that it can be sufficiently loaded, in particular with regard to shear forces that may occur, for example, on an inclination or on a cornering of the mobile crane.

Provision is made in an alternative possible embodiment that the at least one connection means has a base section, a middle section, and a coupling section. The base section here is received in a recess of the counterweight base plate; the middle section projects through an opening of the recess; and the coupling section serves the coupling with the superstructure (in particular the coupling with a ballasting device of the superstructure) and here in particular comprises the centering means and the fastening means. The coupling section may form the end of the connection means disposed opposite the counterweight base plate.

The base section may comprise the placement area and in particular has a greater width than the middle section and the opening of the recess. The counterweight base plate thereby lies on the at least one connection means via the placement area and said connection means cannot slip through the opening since the middle section, that projects through the opening, has a smaller width than the base section. The middle section can have a substantially constant width, with a shape tapering toward the coupling section also being conceivable, for example.

Provision is made in a further possible embodiment that the recess is open toward a lower side of the counterweight base plate and is closed by a cover connectable to the counterweight base plate. The cover can be a cover plate or a metal sheet. The cover can, for example, be able to be installed at the counterweight base plate from below by means of screws. The cover at least partially covers the cutout of the counterweight base plate in the connected state and forms an at least partially closed space within which the base section of the connection means is supported.

The recess here may allow a movement of the base section within the recess in the longitudinal direction of the connection means, with said recess in particular being bounded on one side (top) by an attaching of the placement area to a wall of the recess and on the other side (bottom) by an attaching of the base section to the cover.

The cover in particular does not have any connection to the connection means, but is rather only connectable or connected to the counterweight base plate.

The counterweight base plate (as well as all the counterweight elements that may be stacked thereon) lies completely on the at least one connection means and the connection means does not contact the cover in the raised state due to this degree of freedom of movement that results from the certain displaceability of the base section within the recess. The cover is therefore not loaded in this state. The weight of the connection means only loads the cover in a state placed on the floor or on a placement area. The cover is optionally screwed to the counterweight base plate from below so that the screws only experience a tensile load.

The recess of the counterweight base plate is optionally configured such that the lateral surfaces of the recess and the lateral surfaces of the base section and/or of the part of the middle section of the connection means disposed in the opening of the recess transmit the shear forces that occur.

Due to the movability of the connection means within the recess and the non-existent connection to the cover, the latter is not laterally loaded on an inclination of the counterweight device or on the occurrence of shear forces, but rather where applicable at most a slight friction connection or friction load is applied. This is in particular advantageous when the cover is fastened to the counterweight base plate by means of screws since the screws are thereby only tensioned in accordance with their purpose, and indeed also only in the case in which the connection means loads the cover. However, no shear forces occur that laterally load the screws so that the screws are always free of bending strains.

The cover may form a defined placement area for placing down the counterweight device on a placement device that can, for example, be located on the undercarriage of the mobile crane. The counterweight device can optionally be able to be placed down on the placement device for installation and can also be able to be picked up from it by the ballasting device.

A ballasting device by means of which the counterweight device can be raised and placed down is provided at the superstructure in a further possible embodiment. The counterweight device can in particular be raised from a placement region of the undercarriage and can be placed down on it. The counterweight device is in particular releasably connectable to the ballasting device, i.e. the ballasting device may take over a dual function: the lifting and lowering of the counterweight device and its fastening to the superstructure.

The at least one connection means may have a coupling region, via which a mechanical coupling to the ballasting device can be established, at an end disposed opposite the counterweight base plate (i.e. facing the superstructure or the ballasting device). The coupling region can comprise or represent a mount into which a lifting device, in particular a ballasting cylinder, can be traveled to establish a connection for lifting the counterweight device.

In a further possible embodiment, the ballasting device comprises at least one hydraulic ballasting cylinder that can be releasably brought into engagement with the coupling region of the at least one connection means. The ballasting cylinder in particular has a piston rod that is extendable downwardly from the ballasting device and is couplable with the coupling region of the connection means. Two or more ballasting cylinders and a corresponding number of connection means are optionally provided.

The ballasting device may comprise a ballast frame that is connectable to the superstructure via one or more fastening means (in particular bolt connections). The ballast frame optionally carries the ballasting cylinder or cylinders. Alternatively or additionally, the ballast frame can comprise a winch construction that can e.g. be releasably fastened to the ballast frame. The ballast frame can be releasably connectable to the frame structure of the superstructure via corresponding fastening elements such as bolt mounts so that it can, for example, likewise be dismantled from the superstructure for transport. The installation of the ballast frame at the superstructure can take place via the ballasting cylinders (that lift the ballast frame by extending from the undercarriage to the superstructure) or via lifting equipment (e.g. via the boom of the mobile crane itself or by means of an auxiliary crane).

Provision is made in a further possible embodiment that the coupling region of the at least one connection means comprises a recess into which a coupling piece of the ballasting cylinder can be introduced, in particular by rotation of the superstructure about its axis of rotation. The coupling piece can be part of the piston rod of the ballasting cylinder or can be a component connected thereto. The coupling piece can be lockable in the recess, for example by means of a separately provided locking unit. Alternatively or additionally, the locking can result simply by a mechanical abutment that blocks a further movement of the coupling piece relative to the coupling region.

The recess of the coupling region can be configured in a manner known per se such that it allows a lateral pushing in (e.g. following a circular movement) of the ballasting cylinder and blocks a movement of the ballasting cylinder out of the recess in a shape matched manner in a vertical direction in the connected state (i.e. in the installed position in which the counterweight device can be raised by traveling in the ballasting cylinder or cylinders). In the raised state, the counterweight device can lie on the coupling piece of the at least one ballasting cylinder or can be suspended at it via the recess of the at least one connection means.

In a further possible embodiment, at least one counterweight element is provided that can be placed or stacked on the counterweight base plate and has at least one recess through which the at least one connection means projects in the placed down state. The at least one counterweight element is in particular of plate shape. A plurality of further counterweight elements or counterweight plates are optionally provided that can be stacked on the counterweight base plate. The counterweight base plate here in particular represents the bottommost counterweight element of the counterweight device on which all optionally additionally provided further counterweight elements can be stacked. The recesses of all the counterweight elements here overlap at least in part so that the at least one connection means can project through the stack and is accessible from above.

The at least one connection means here in particular projects from the topmost counterweight element so that the fastening means and also the centering means are located and are accessible above the topmost counterweight element. A releasable connection to the superstructure can thereby be established via the fastening means after the raising of the counterweight device and an alignment or positioning of the counterweight device comprising the counterweight base plate, the at least one connection means, and all the counterweight elements stacked on the counterweight base plate can take place by means of the centering means.

Provision is made in a further possible embodiment that the recess of at least one counterweight element is configured such that the coupling piece of the ballasting cylinder can be positioned within the recess beside the coupling region of the connection means and can be traveled into the coupling region (or its recess) by rotation of the superstructure about its vertical axis of rotation. The ballasting cylinder here describes a circular path and travels laterally into the coupling region. The recess of at least those counterweight elements that lie at the level of the coupling region and thereabove therefore have to be correspondingly wider to permit such a circular movement on the coupling of the ballasting cylinder with the connection means. The counterweight elements lying therebelow can in contrast be configured differently so that only the connection means substantially passes through.

The recess optionally has a mechanical abutment at which the coupling piece of the ballasting cylinder is attached in a locked position in which the ballasting cylinder and the connection means are correctly coupled to one another in which the counterweight device can therefore be lifted by the at least one ballasting cylinder. The abutment can be formed by a wall of the recess itself, whereby a particularly simple embodiment results. Alternatively, the abutment can also be implemented by a separate component arranged in the recess.

More than one connection means are optionally provided for a stable support of the counterweight elements and for the connection of the counterweight device at the superstructure. In a further possible embodiment, the counterweight device therefore comprises at least two connection means that are spaced apart from one another and are connected to the counterweight base plate. Exactly two connection means can be provided or also more than two connection means.

The connection means are optionally arranged at the same distance from the center of gravity or from a center line of the counterweight base plate (that is optionally aligned in parallel with the longitudinal axis of the superstructure). An axially symmetrical arrangement of the counterweight base plate and the connection means can thereby result overall.

Alternatively or additionally, the connection means can be arranged rotated with respect to one another (about the vertical axis in each case), i.e. their coupling regions do not exactly face one another. This can be due to the circumstance that the ballasting cylinders are moved on a circular path by rotation of the superstructure to establish the coupling with the connection means. The connection means can in this case in particular be designed as flat metal sheet constructions that are not aligned in parallel, but are rather inclined at a specific angle to one another.

The connection means are, however, optionally not rotated with respect to one another, but are rather arranged in parallel with one another. The manufacture of the counterweight base plate and also of the counterweight elements that may be stackable thereon is thereby simplified.

The counterweight base plate and the counterweight elements are in particular each formed by a box, in particular a steel box, into which weights, in particular solid metal blocks, are placed on the manufacture. The box is subsequently filled with a binding agent and brought up to the desired weight. The counterweights manufactured in this manner should be inexpensive, robust, and heavy. The binding agent can have a lower specific density than the metal placed in. Large and solid metal portions are thus advantageous. The more complicated the shape of the counterweight base plate or of the counterweight elements is and the more bulges and interruptions are present, the more difficult the manufacture or the design of the steel box with solid weights or blocks is.

Since the connection means are optionally arranged in parallel with one another and in particular in parallel with the side edges of the counterweight base plate, geometrically ideal regions of the counterweight base plate and optionally of the counterweight elements for filling the respective steel boxes with solid weights result in the manufacture.

It must be noted in the case of the parallel arrangement that the ballasting cylinders in particular move on a circular path on the installation of the counterweight device. This circumstance must be accordingly taken into account in the design of the connection means or of the coupling regions of the connection means. This can be done e.g. via sufficiently large recesses of the coupling regions. Arcuate recesses or other solutions would alternatively or additionally also be conceivable.

Provision is made in a further possible embodiment that the counterweight device can be placed on a placement region of the undercarriage and comprises at least one placement centering means for positioning the counterweight device on the placement region. The placement region optionally has at least one corresponding counter-placement centering means that can be brought into engagement with the placement centering means for the correct positioning of the counterweight device on the undercarriage. The counterweight device or the counterweight base plate together with connection means can thereby be aligned in a correct position that is required for a smooth taking up or coupling with the ballasting device, in particular for a smooth coupling of the ballasting cylinders. The placement centering means is in particular arranged at a lower side of the counterweight base plate and/or of the at least one connection means.

The placement centering means can be a cutout and the counter-placement means can be a projection, a bolt, or another projecting element that can be introduced into the cutout. For a simpler introduction, the placement centering means and/or the counter-placement means can have corresponding chamfered surfaces or at least one introduction chamfer.

The cutout acting as a placement centering means can comprise an elongate region and a deeper region. In this case, on the alignment of the counterweight base plate, the counter-placement centering means projecting in the direction of the counterweight base plate is first introduced into the elongate region of the cutout. There is hereby already one degree of freedom fewer present for the correct positioning. The counter-placement centering means is then guided in the elongate region until the deeper region of the cutout has been reached and the counterweight base plate is let down into its correct position.

The reverse coupling geometry (placement centering means as the projection, bolt, or similar and the counter-placement centering means as the cutout) is naturally likewise possible.

Provision is made in a further possible embodiment that the fastening means comprises a fastening section having a bolt mount to establish a bolt connection to the superstructure. The fastening section can correspond to the previously named coupling section of the connection means or can be a part thereof. Corresponding fastening means, in particular to establish a bolt connection, are likewise located at the superstructure.

The superstructure optionally comprises a stabilization metal sheet that is located below the fastening means of the superstructure, i.e. below the bolt connection in the bolted state, and has an opening through which the fastening section of the connection means can be pushed to establish the bolt connection. On the raising of the counterweight device to the superstructure or to the ballasting device, the fastening section of the at least one connection means travels into the opening of the stabilization meta sheet until the fastening means of the connection means and the superstructure are located above the stabilization metal sheet in their position to be adopted for the establishing of the connection, are in particular disposed opposite one another or overlap. The connection, in particular the bolt connection, can then be established. The opening optionally has a geometry complementary to the fastening section and in particular of slit shape.

The stabilization metal sheet is here in particular configured such that it takes up shear forces in the bolted state on an inclination of the mobile crane and thereby relieves the connection, in particular the bolt connection, disposed thereabove. On an inclination, the connection means is here in particular supported via the fastening section at the walls of the opening of the stabilization metal sheet. The connection, in particular the bolt connection, disposed thereabove, thereby has to substantially only take up forces along the longitudinal direction of the connection means. With a bolt connection, the fastening means can in particular migrate on the bolt on an inclination until the fastening section abuts the corresponding side of the stabilization metal sheet or said opening. After this abutting, horizontal forces are directly introduced into the stabilization metal sheet by the connection means. The connection via the bolts substantially remains a load in a vertical direction.

Provision is made in a further possible embodiment that the superstructure comprises a counter-centering means that is configured to automatically position the counterweight device in an installation position in which it is connectable to the superstructure, in particular to said ballasting device, on the raising of the counterweight device by interaction with the centering means of the connection means. The centering means is optionally configured as an element extending substantially upwardly in the longitudinal direction of the connection means (i.e. in a direction remote from the counterweight base plate), for example as a projection. The counter-centering means accordingly forms a recess into which the centering means travels on the raising of the counterweight device. The reverse case (centering means as a recess and the counter-centering means as a projection protruding downwardly from the superstructure, or similar) is likewise possible.

The centering means here optionally comprises at least one chamfered surface or a chamfer, i.e. it can have one or more chamfered surfaces, for example in one or two directions, to facilitate the traveling into one another of the centering means and the counter-centering means. A conical shape with a peripheral chamfer of the centering means or counter-centering means is likewise possible.

Alternatively or additionally, the centering means is optionally arranged in the region of the fastening means at an end of the connection means disposed opposite the counterweight base plate, i.e. in particular in a coupling section of the connection means.

In a further possible embodiment, the at least one connection means comprises at least one abutment element for fastening an attachment means (e.g. a chain or a rope) of lifting equipment for raising the counterweight base plate. The counterweight base plate together with the one or more connection means can thereby be lifted by an auxiliary crane or by the mobile crane to be equipped itself and can be positioned on a placement region on the undercarriage of the mobile crane, for example. The attachment element is optionally formed by a recess of the connection means. Hook elements, projections, or the like are also conceivable to be able to fasten the attachment means.

In a further possible embodiment, an upper and in particular plate-like counterweight element is provided that has at least one fastening means for the direct fastening to the superstructure or to the ballasting device. The fastening can take place via screws and/or via bolt connections. It is thereby possible to not also dismantle the topmost counterweight element (and optionally a second counterweight element lockable therewith) for transport and to transport it separately, but rather instead to fixedly connect it to the steel construction of the superstructure or the ballasting device to vary the axial loads on the traveling of the mobile crane in public road traffic or to better utilize them (with a mobile crane having a wheeled chassis). When the counterweight device is removed, the topmost ballast element therefore does not move back to the undercarriage from which the placed down remaining counterweight device is then removed and placed on a separate transport vehicle. The nationally permitted axial loads can be better utilized since selectively no, one, two or more counterweight elements (that are in this case connectable to the topmost counterweight element via a separate locking mechanism) remain(s) at the superstructure for the public road trip.

In a further possible embodiment, the counterweight base plate together with the one or more connection means has a structure axially symmetrical with a center axis extending through the center of the counterweight device.

In a further possible embodiment, the counterweight base plate and/or at least one counterweight element placeable thereon has/have a swept shape, i.e. a shape differing from a rectangle, in a plan view.

The present disclosure furthermore relates to a counterweight device for a mobile crane in accordance with the disclosure. In this respect, the same advantages and properties obviously result as for the mobile crane in accordance with the disclosure so that a repeat description will be dispensed with. The counterweight device optionally comprises at least one counterweight element that can be placed or stacked on the counterweight base plate. The counterweight element optionally has a recess for leading through the connection means.

BRIEF DESCRIPTION OF THE FIGURES

Further features, details, and advantages of the disclosure result from the embodiments explained in the following with reference to the Figures. There are shown.

DETAILED DESCRIPTION

Figure 1:
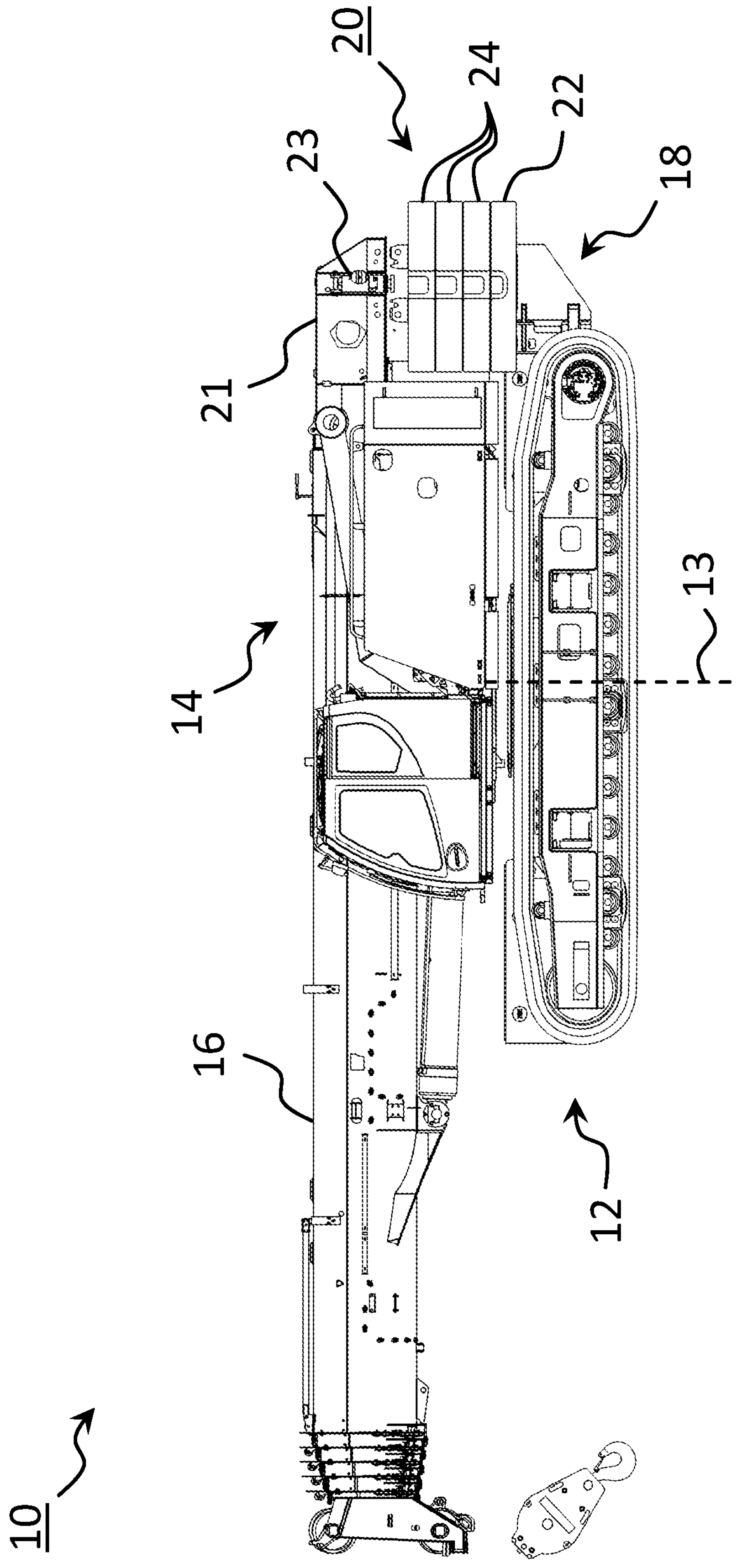
FIG. 1: the mobile crane in accordance with the disclosure in accordance with an embodiment in a side view.

An embodiment of the mobile crane 10 in accordance with the disclosure in the form of a crawler crane is shown in a side view in FIG. 1. The mobile crane 1 has an undercarriage 12 having a crawler chassis and a superstructure 14 supported on the undercarriage 12 rotatable via a slewing gear about a vertical axis of rotation 13. The superstructure 14 comprises a telescopic boom 16 supported luffably about a horizontal axis and a counterweight arrangement also called superstructure ballast.

The superstructure ballast in this embodiment comprises a ballast frame 21 that is connected to the steel structure of the superstructure 14 via bolt connections and that can be removed from the superstructure 14 for transport. Two hydraulic ballasting cylinders 23 whose piston rods can be downwardly extended and have a coupling piece are received at the ballast frame 21. A counterweight device 20 can be lifted from a placement region to the superstructure 14 and can be connected thereto via the ballasting cylinders 23. In this embodiment, the placement region is formed by a foldable placement device 18 that is shown in more detail in FIG. 7 at the rear of the undercarriage 12. The placement region could, however, also be located at an upper side of the undercarriage 12 or on the floor. Conversely, the counterweight device 20 can be placed down on the placement device 18 again via an extension of the ballasting cylinders 23 and can be loaded onto a transport vehicle from there, optionally by means of an auxiliary crane or the boom 16 of the mobile crane 10.

The counterweight device 20 comprises a counterweight base plate 22 on which a plurality of counterweight elements 24 can be stacked. The superstructure ballast can thereby be variably configured and can be adapted to the desired deployment. The coupling of the counterweight device 20 to the ballasting cylinders 23 takes place via connection means 30 that project perpendicularly upwardly from the counterweight base plate 22 and that have coupling regions 38 at their upper ends for the reversible coupling with the coupling pieces of the ballasting cylinders 23 and fastening means 36 for fastening the counterweight device 20 to the ballast frame 21. The alignment or positioning of the counterweight device 20 in an installation position at the ballast frame 21 for the establishing of the connection via the fastening means 36 takes place via centering means 34 of the connection means 30.

Figure 2:
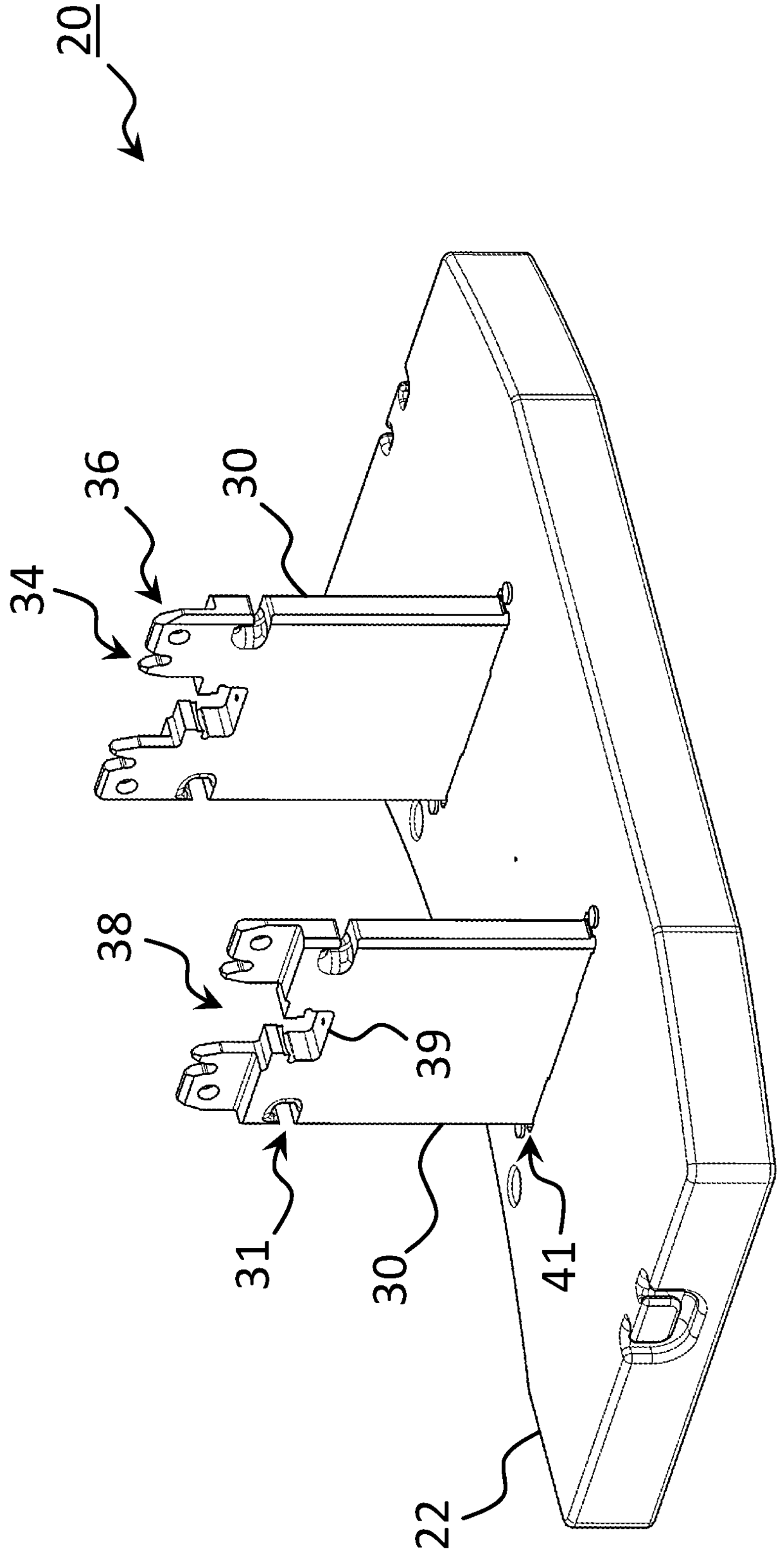
FIG. 2: a first embodiment of the counterweight device in accordance with the disclosure without counterweight elements in a perspective view.

The counterweight base plate 22 together with connection means 30 of the counterweight device 20 in accordance with the disclosure in accordance with a first embodiment is shown in a perspective view in FIG. 2. The counterweight base plate 22 has a swept shape and is connected to two connection means 30 that project perpendicularly upwardly from the counterweight base plate 22. The counterweight elements 24 not shown here are formed in plate shape and have corresponding recesses through which the connection means 30 project. The counterweight elements 24 are therefore stacked on the counterweight base plate 22 and are “threaded” on the connection means 30 in so doing until only the end regions of the connection means 30 project over the topmost counterweight element 24 (cf. FIG. 1).

The indications of direction “upward” and “downward” used herein relate to the case that the counterweight base plate 22 (and the mobile crane 10) stand on a level base and the connection means 30 are vertically aligned.

The connection means 30 that can also be called connection blades or simply blades are sheet metal constructions that are produced in one piece, that have a flat base shape, and that are connected to the counterweight base plate 22. Since the connection means 30 do not consist of a plurality of mutually connected parts, but are rather formed in one piece, weld connections that are complicated to manufacture and that have correspondingly high demands do not have to be provided.

In the first embodiment shown here, the connection means 30 are not fixedly connected to the counterweight base plate 22, but are rather displaceably supported in recesses 40 of the counterweight base plate 22 along the longitudinal axes of the connection means 30 (i.e. in the vertical direction with a planar base).

Figure 3:
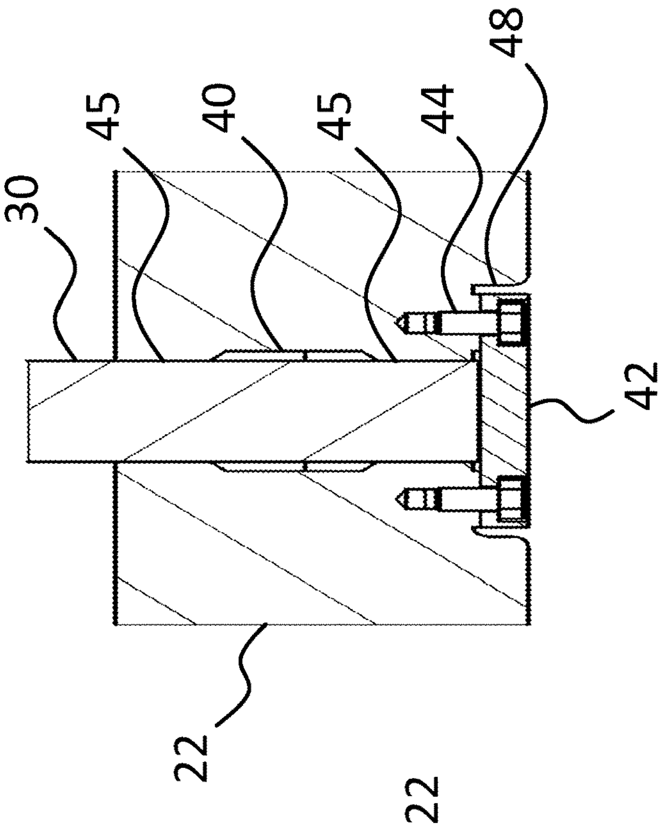
FIG. 3: a section through one of the connection means along its short side in the region of the counterweight base plate.
Figure 4:
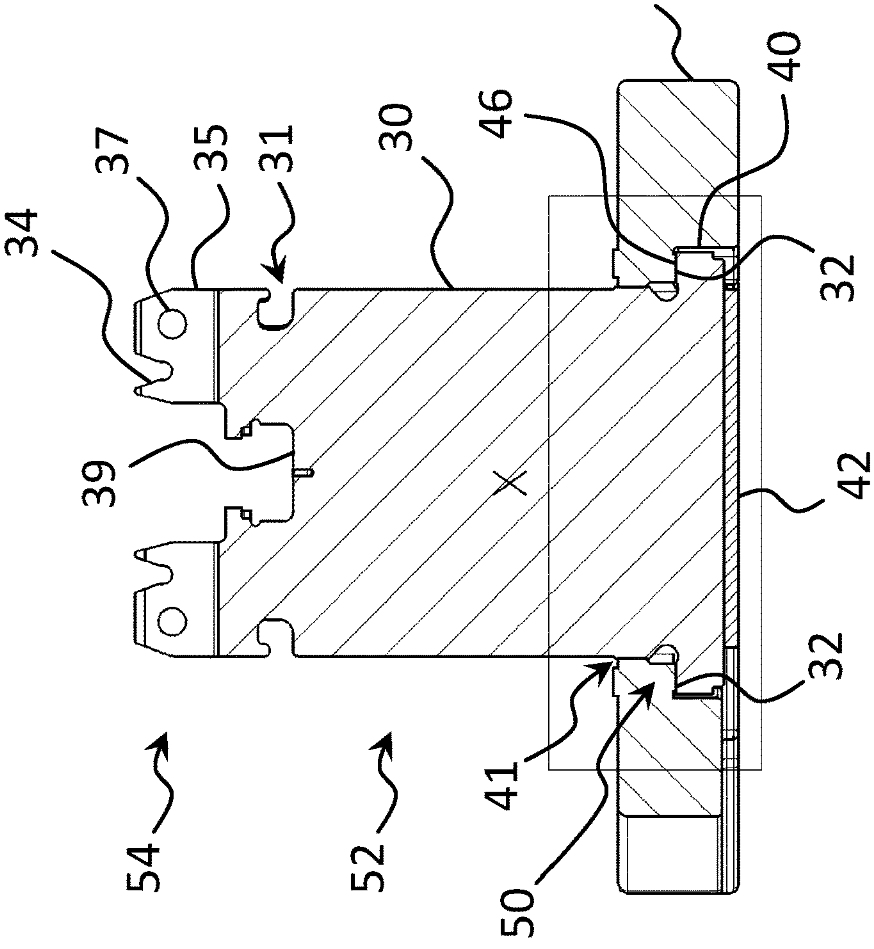
FIG. 4: a section through one of the connection means along its long side in the region of the counterweight base plate.

A section through one of the connection means 30 and the counterweight base plate 22 without counterweight elements 24 is shown along the short side of the connection means 30 in FIG. 3 and along the long side of the connection means 30 in FIG. 4.

The connection means 30 each have a lower base section 50 that merges into a middle section 52 having a substantially constant width (defined here as the extent along the long side of the connection means 30). A coupling section 54 for coupling the connection means 30 and thus the counterweight device 20 with the ballasting cylinders 23 of the ballasting device of the mobile crane 10 is located above the middle section 52. The connection means 30 has its maximum width in the base section 50. When only one connection means 30 is spoken of for reasons of simplicity in the following, both connection means 30 are naturally meant.

The connection means 30 is supported via its base section 50 in a recess 40 in the counterweight base plate 22. The recess 40 is open toward the lower side of the counterweight base plate 22 so that the connection means 30 can be pushed into the recess 40 from below to produce the counterweight device 20. The recess 40 merges, viewed from the lower side, into a section having a smaller width that is open toward the upper side of the counterweight base plate 22 and forms an opening 41.

As can be recognized in FIG. 4, the base section 50 of the connection means 30 merges within the recess 40 into the middle section 52 having a reduced width so that the center axis 52 extends through the region of the recess 40 having a reduced width and finally projects out of the counterweight base plate 22 through the opening 41 at the upper side. At the transition between the base section 50 and the middle section 52, the connection means 30 has two placement areas 32 that form the surface of the base section 50 adjacent to the middle section 52. The (partial) placement areas 32 in this embodiment form a flat, horizontal surface and can together be called a "placement area 32" of the connection means 30.

The counterweight base plate 22 lies via a wall 46 of the recess 40 that forms the transition between the regions of larger and smaller widths of the recess 40 on the placement areas 32 of the connection means 30. This wall 46 thus simultaneously forms an abutment for the base section 50 so that the connection means 30 cannot slip upwardly out of the counterweight base plate 22. In the raised state of the counterweight device 20 or in the state thereof fastened to the superstructure 14 the counterweight base plate 22 and thus all the counterweight elements 24 stacked thereon introduce their weight force via the contact on the placement areas 32 directly into the connection means 30.

The recess 40 is covered at the lower side of the counterweight base plate 22 by means of a metal cover plate 42 so that the connection means 30 cannot slip downwardly out of the recess 40. The metal cover plate 42 is fastened directly to the counterweight base plate 22 via a plurality of screws 44 (four here) and forms a removable cover for the recess 40.

Figure 5:
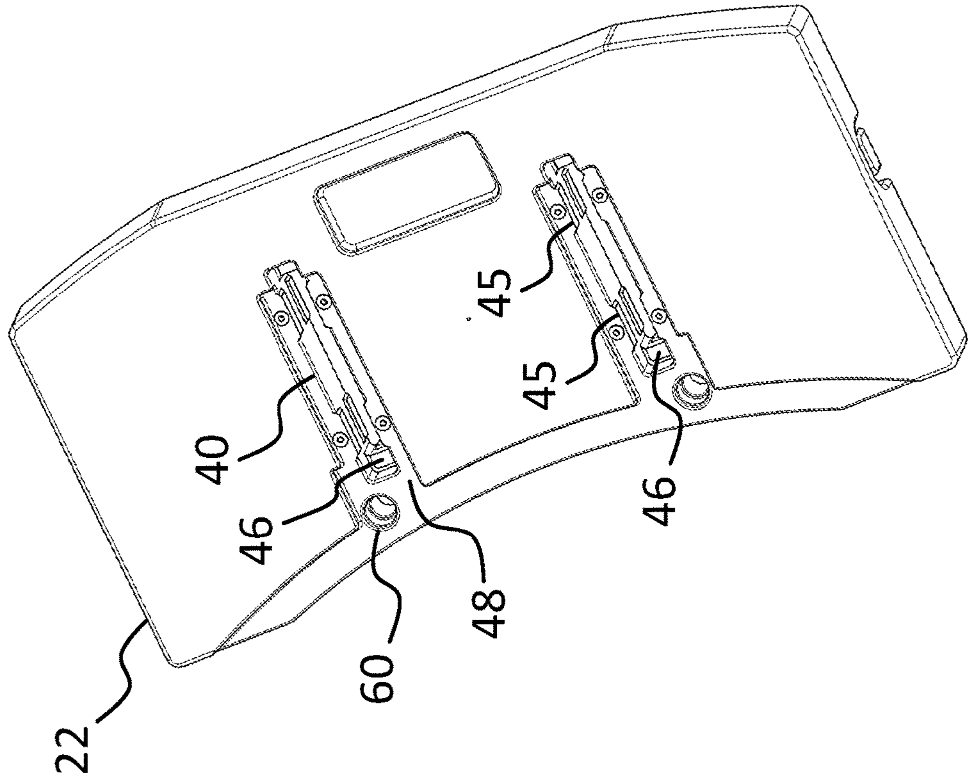
FIG. 5: a perspective view of the counterweight base plate with a view of its lower side without connection means and covers.
Figure 6:
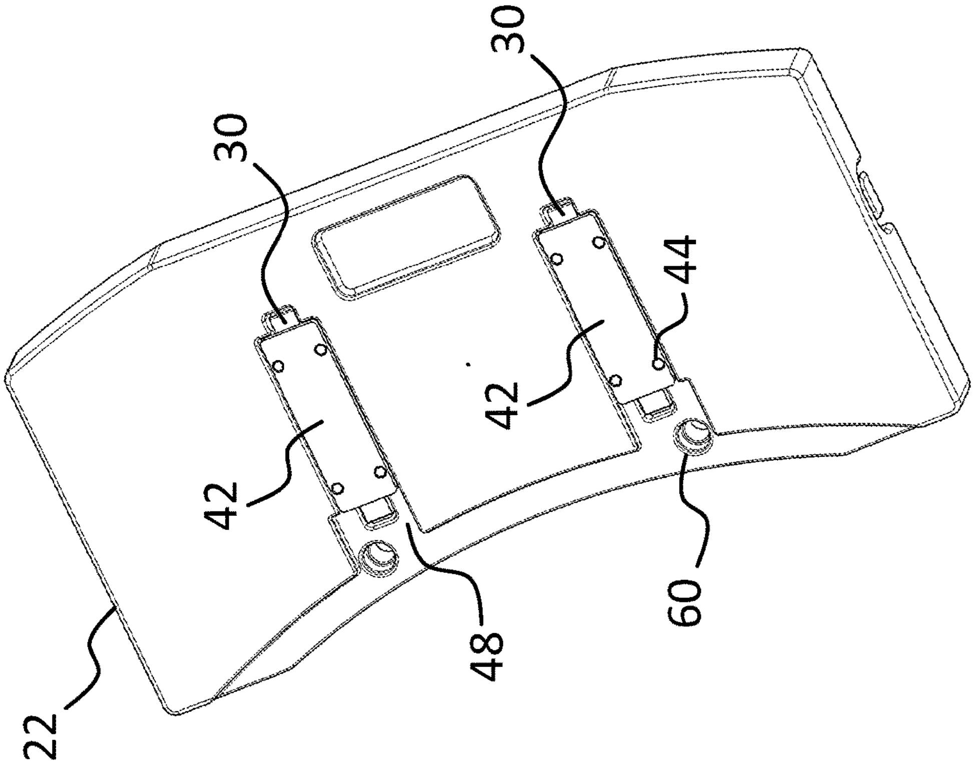
FIG. 6: the counterweight base plate in accordance with FIG. 5 with connection means and installed covers.

In FIG. 5, the counterweight base plate 22 is shown with a view of its lower side and without metal cover plates 42. FIG. 6 shows the counterweight base plate 22 with connection means 30 inserted into the recesses 40 and with installed metal cover plates 42. The latter are let into or lowered into cutouts 48 at the lower side of the counterweight base plate 22 so that they do not project.

The metal cover plate 42 does not have any connection to the connection means 30, but is rather only installed at the counterweight base plate 22. As can be recognized in FIG. 6, the rectangular metal cover plate 42 does not completely cover the recess 40 so that the marginal regions of the connection means 30 are visible. The metal cover plate 42 could naturally also completely cover the recess 40, however.

The base section 50 of the connection means 30 can move slightly within the recess 40 along the longitudinal direction of the connection means 30, i.e. the connection of the connection means 30 with the counterweight base plate 22 has a certain movement play or degree of freedom. Since the metal cover plate 42 is not connected to the connection means 30, the counterweight base plate 22 lies on the placement areas 32 of the connection means 30 in the raised state or in the state installed on the superstructure 14 and the connection means 30 does not press onto the metal cover plate 42. The latter is thus relieved in this state. The connection means 30 is only seated on the metal cover plate 42 with a force on the counterweight base plate 22 directed upwardly with respect to the connection means 30 or in the placed down state and thus exerts a downwardly directed force on the metal cover plate 42. This corresponds to a tensile load of the screws 44.

The recess 40 is shaped such that it can take up the shear forces that act on the connection means 30 and that can occur, for example, on an inclination of the mobile crane 10 (slanting base) or on a cornering of the mobile crane 10. The recess 40 has correspondingly machined side surfaces for this purpose in the region of reduced width that are contacted by the side surfaces of the middle section 52 of the connection means 30 in the case of shear forces occurring. As can be recognized in FIGS. 3 and 5, the recess 40 has projections 45 that form the lateral contact surfaces for the connection means 30 in the region of smaller width. The shear forces (perpendicular to the longitudinal axis of the connection means 30) are thus fully introduced via the machined side surfaces of the recess 40 and the forces acting via the placement areas 32 along the longitudinal axis of the connection means 30.

The connection between the metal cover sheet 42 and the connection means 30 is therefore at maximum a compression connection and, where applicable, a slight friction connection that result with shear forces that occur. The screws 44 can conduct the compression forces onward in accordance with their purpose (tensile load). Shear forces are minimal and thus always in the permitted range. The screws 44 are always free of bending strains due to the degree of freedom of the base section 50 within the recess 40.

The metal cover plates 42 also form defined support points of the counterweight device 20. The counterweight base plate 22 can be placed thereon for installation on the undercarriage 12 and the counterweight elements 24 can be introduced via their recesses around the connection means 30 and can be placed on the counterweight base plate 22.

Figure 7:
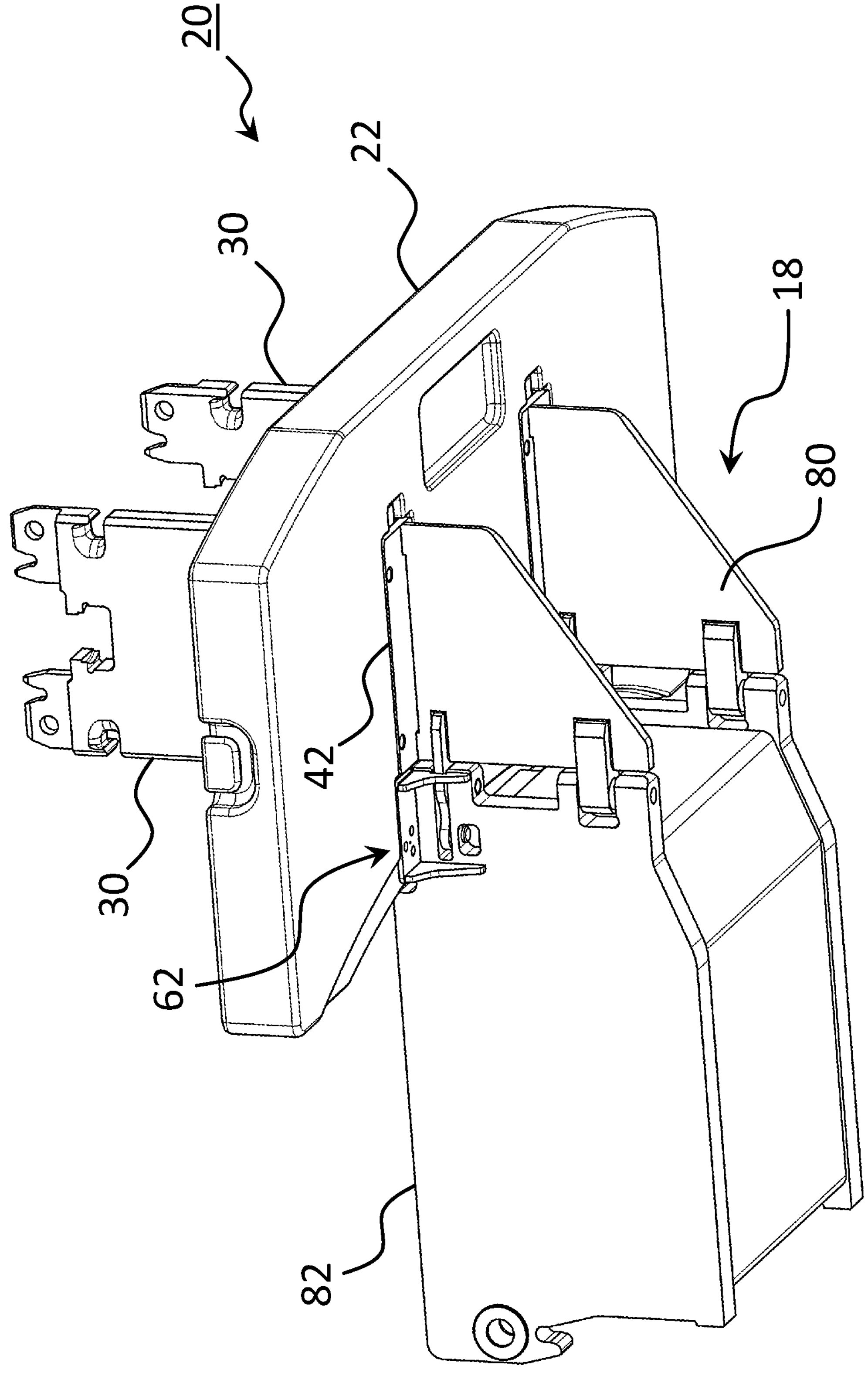
FIG. 7: a perspective view of the counterweight device in accordance with FIG. 2 placed on a placement device of the undercarriage.

A possible embodiment for a placement device 18 of the undercarriage 12 is shown in FIG. 7. In this respect, the central ballast 82, that is directly installable at the undercarriage 12 via fastening elements, is expanded by a foldable mount for the counterweight device 20. In this respect, two pivot parts 80 are foldably fastened to side walls of the central ballast 82 and have support surfaces on which the counterweight device 20 can be placed at their upper sides. These support surfaces of the pivot parts 80 correspond to the metal cover plates 42 of the counterweight base plate 22.

Alternatively, the counterweight device 20 can be placed directly on a placement area of the undercarriage 12 or on the ground.

As initially explained, the connection means 30 simultaneously serve both the taking up and raising of the counterweight device 20 and its centration at and fastening to the ballasting device (or to the ballast frame 21). For this purpose, the connection means 30 have a coupling section 54 at their end disposed opposite the base section 50 (see FIG. 4).

The coupling section 54, on the one hand, comprises a coupling region 38 having an upwardly open, bracket-shaped recess 39 into which an especially shaped (in particular mushroom shaped) end or coupling piece of the corresponding ballasting cylinder 23 can move laterally. In the final position in which the counterweight device 20 can be securely raised (=locking position), the coupling piece of the ballasting cylinder 23 is located completely within the recess 39 (as the second ballasting cylinder 23 associated with the second connection means 30) whose shape makes a shape matched raising of the counterweight device 20 possible by retracting the ballasting cylinder 23 since its coupling piece cannot slip upwardly out of the recess 39.

The coupling of the ballasting cylinders 23 with the connection means 30 in particular takes place by a rotation of the superstructure 14 about its axis of rotation 13. The recesses of the counterweight elements 24 that are stacked on the counterweight base plate 22 and through which the connection means 30 project are therefore formed accordingly at least at the level of the coupling regions 38. At least the counterweight elements 24 disposed at the level of the coupling regions 38 in the stacked state are therefore in particular widened in the direction of rotation of the superstructure 14 so that the ballasting cylinders 23 can be retracted downwardly beside the connection means 30 into the recesses until the coupling pieces are at the level of the recesses 39 of the coupling regions 38. A coupling can then be established by rotating the superstructure 14.

So that the coupling pieces of the ballasting cylinders 23 are not moved through the recesses 39, but rather reach their correct locking position, the recesses of the corresponding counterweight elements 24 are optionally configured such that their side walls form corresponding mechanical abutments for the coupling pieces of the ballasting cylinders 23. An overrun of the ballasting cylinders 23 is thereby simply and effectively prevented.

Figure 8:
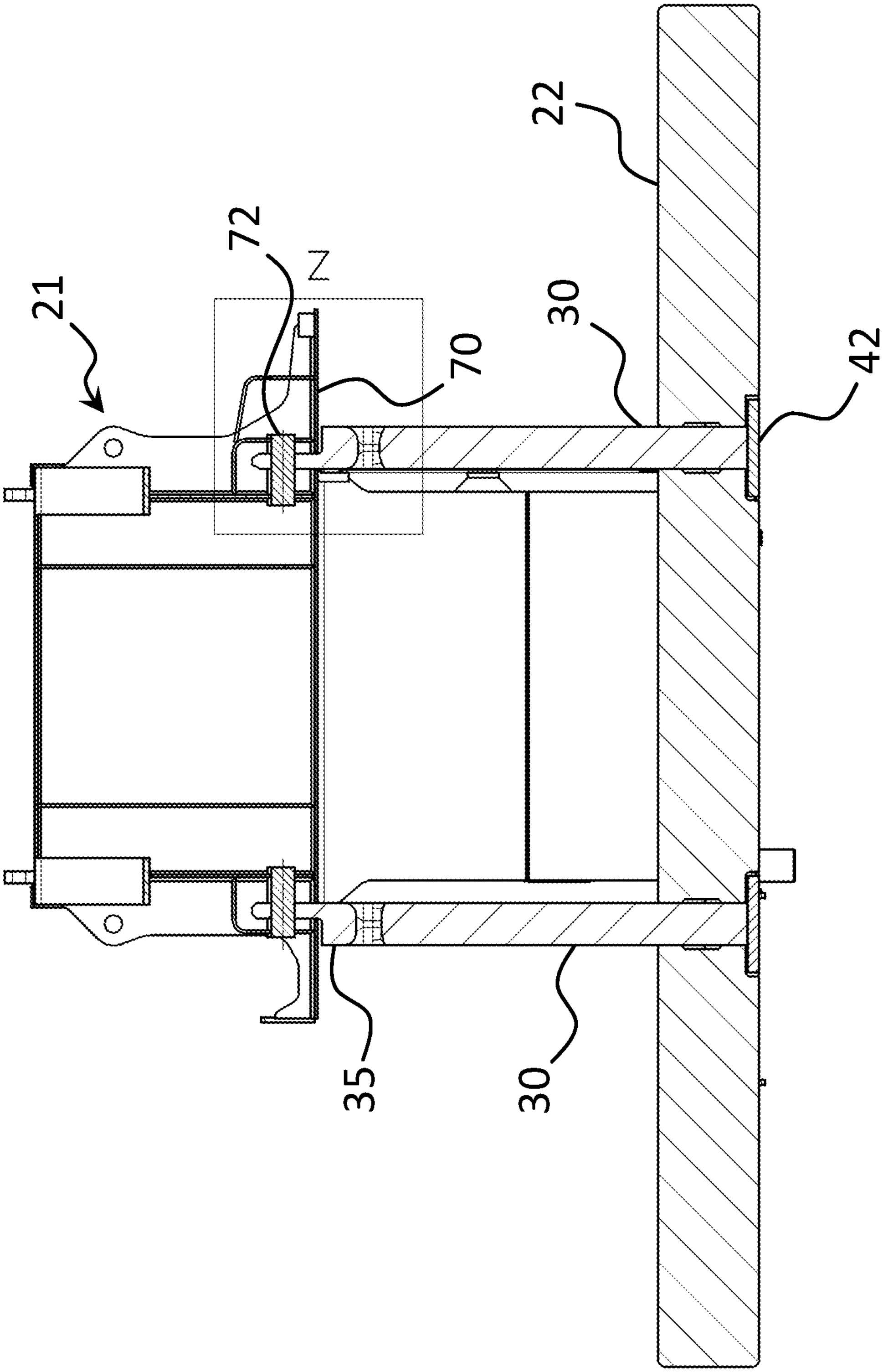
FIG. 8: a section through the counterweight device fastened to the superstructure in the region of the connection means and its bolting to the superstructure.
Figure 9:
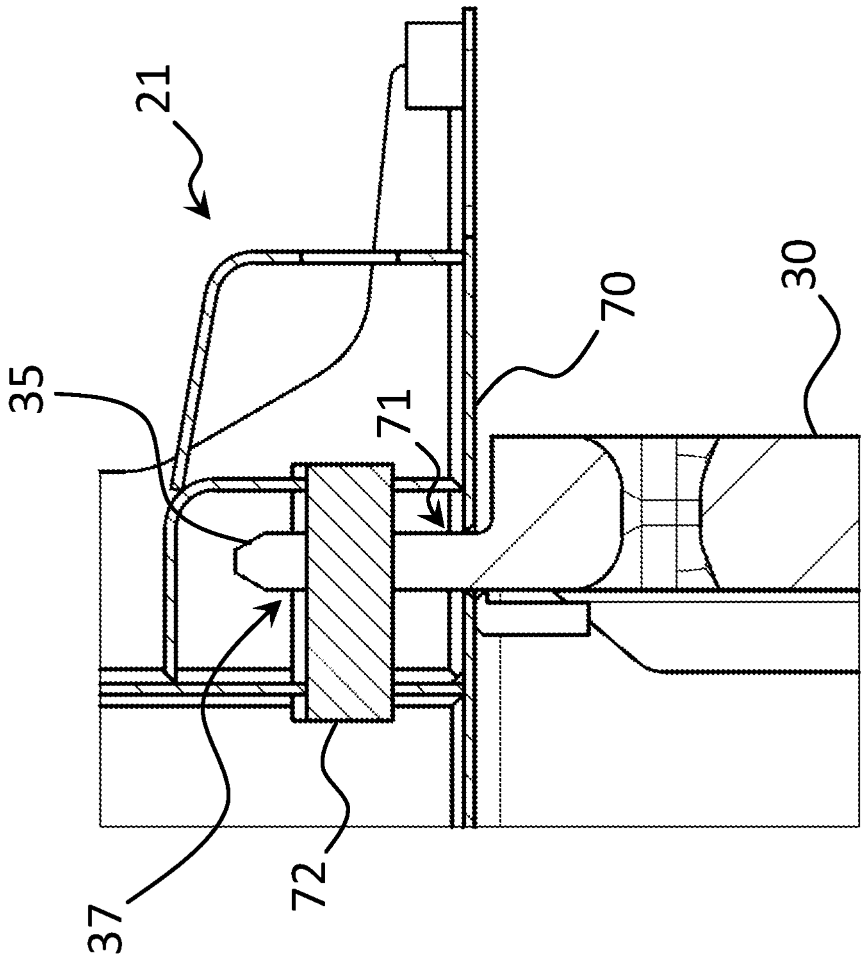
FIG. 9: an enlarged view of the fastening section of one of the connection means of the counterweight device in accordance with FIG. 8 bolted to the superstructure.

After the raising of the counterweight device 20 to the superstructure 14 or to the ballast frame 21, the connection means 30 are bolted to the ballast frame 21. The ballasting cylinders 23 are thereby relieved during crane operation. A sectional view through the counterweight base plate 22 and the connection means 30 in a state in which the counterweight device 20 is installed on the ballast frame 21 without additional counterweight elements 24 is shown in FIG. 8. FIG. 9 shows an enlarged view of a single (bolt) connection of a connection means with a ballast frame 21.

The coupling section 54 of the connection means 30 comprises an upwardly projecting fastening section 35 that is arranged above the coupling region 38 and that comprises both the centering means 34 and the fastening means 36 in the form of a bolt mount 37 (see FIG. 4). More precisely, the recess 39 of the coupling region 38 is located centrally at the connection means 30 (with a view of the long side), while two fastening sections 35 each having a centering means 34 and a bolt mount 37 are arranged above the recess 39 and at both sides thereof. Two bolt connections are therefore provided per connection means 30 for fastening the counterweight device 20 to the ballast frame 21.

In the present embodiment, the fastening sections 35 have a smaller thickness (defined here as the extent along the shorter side of the connection means 30) than the middle section 52 of the connection means 30, with this not necessarily having to be the case.

As can be recognized in FIGS. 8 and 9, the ballast frame 21 has an at least sectionally horizontally extending stabilization metal plate 70 having corresponding (and in particular slit-like) openings 71 into which the fastening sections 35 of the connection means 30 travel. Corresponding counter-fastening means in the form of further bolt mounts are located above the stabilization metal sheet 70. If the counterweight device 20 has been completely lifted onto the ballast frame 21 via the ballasting cylinders 23, i.e. if the counterweight device 20 is therefore located in its installation position, the bolt mounts 37 of the connection means 30 overlap the bolt mounts of the ballast frame 21 so that the corresponding bolts 72 can be placed (and in particular subsequently secured) to establish the bolt connections.

In the case of a dynamically loaded slanted travel or an inclination of the mobile crane 10, forces occur in the vertical and horizontal directions. These forces would be unfavorable for a single bolt connection. The connection means 30 are for this reason led through the stabilization metal sheet in their fastening sections 35. The bolt mount 37 can thus migrate on an inclination of the bolt mount 37 due to the dynamic load on the bolt 72 until the fastening section 35 contacts the corresponding side of the opening 71 of the stabilization metal sheet 70. After this contact, horizontal forces are directly introduced into the stabilization metal sheet 70 of the superstructure 14 by the connection means 30. The connection via the bolts 72 substantially remains a load in a vertical direction (i.e. perpendicular to the longitudinal bolt axis.

The installation position can be defined in the longitudinal direction of the connection means 30 via corresponding mechanical abutments at the connection means 30 and at the ballast frame 21.

A centering means 34 in the form of a projection or mandrel that projects upwardly and tapers in the longitudinal direction of the connection means 30 and via which the counterweight device 20 is brought into the desired installation position on the retraction of the ballasting cylinders 23 into the desired installation position is additionally provided at each of the fastening sections 35. The centering means 34 here cooperate with counter-centering means, not shown in more detail, at the ballast frame 21 and provide an automatic alignment of the counterweight device 20 on the raising at the ballast frame 21 due to their chamfered contours or insertion chamfers.

The centering means 34 here taper both along the long side and along the short side of the connection means 30, that is in two directions The centering means 34 can naturally have any other desired shape that effects a fine positioning or alignment of the counterweight device 20 on the raising to the ballast frame 21 into the installation position, for example a conical shape.

The counterweight base plate 22 in particular has the following objectives:

- positioning the connection means 30 for the equipping of the counterweight device 20 by the ballasting cylinders 23 on the superstructure 14;
- positioning the counterweight device 20 on the undercarriage 12, for example on a placement device 18 such as shown in FIG. 7. The coupling pieces of the ballasting cylinders 23 can thus engage into the coupling regions 38 of the connection means 30. This positioning has to take place very precisely since it in particular takes place by means of a rotational movement of the superstructure 14 about the axis of rotation 13 on the undercarriage 12;
- the counterweight base plate 22 furthermore has to hold the connection means 30 securely in position, even when shear forces occur. Such shear forces can occur, for example, when the ballasting cylinders 23 rotate into the connection regions 34 and abut at or rub in them. The shear forces can also occur with inclinations or on cornering.

The connection means 30 have recesses 31 laterally at the middle section 52 that serve as attachment elements for fastening attaching means (e.g. a chain or a rope) of a crane for handling the carrier plate 22.

In the embodiment shown here, the connection means 30 are aligned in parallel with one another and with the side edges of the counterweight base plate 22. A particularly favorable arrangement thereby results that facilitates the manufacture of the counterweight base plate 22. This in particular takes place by filling a steel box with solid metal blocks and a subsequent filling up with a binding agent. The parallel arrangement generates geometrically ideal regions for filling the steel box with metal blocks. The manufacture is thereby possible in a simple and inexpensive manner. The same applies to the counterweight elements 24 and to their recesses for leading through the connection means 30.

The circular cutouts 60 in the lower side of the counterweight base plate 22 to be recognized in FIGS. 5 and 6 in the regions of the cutout 48 and adjacent to the recesses 40 serve as a placement centering means for the correct positioning of the counterweight base plate 22 on the placement region of the undercarriage 12. The latter optionally has corresponding projections as counter-placement centering means 62 that travel into the cutouts 60. The connection means 30 are thereby always in their correct position for equipping the counterweight device 20 that is in particular known to the crane control.

A specific example is shown in FIG. 7 in which the counter-placement centering means 62 are arranged on platforms that are installed laterally at the side walls of the central ballast 82.

To enable a positioning of the counterweight base plate 22 at different distances from the axis of rotation 13 (e.g. in combination with ballasting cylinders 23 adjustable in their relative position to the axis of rotation 13 of the superstructure), more than two placement centering means 60 can be provided, such as described, for example, in DE 10 2015 013 488 A1.

Figure 10:
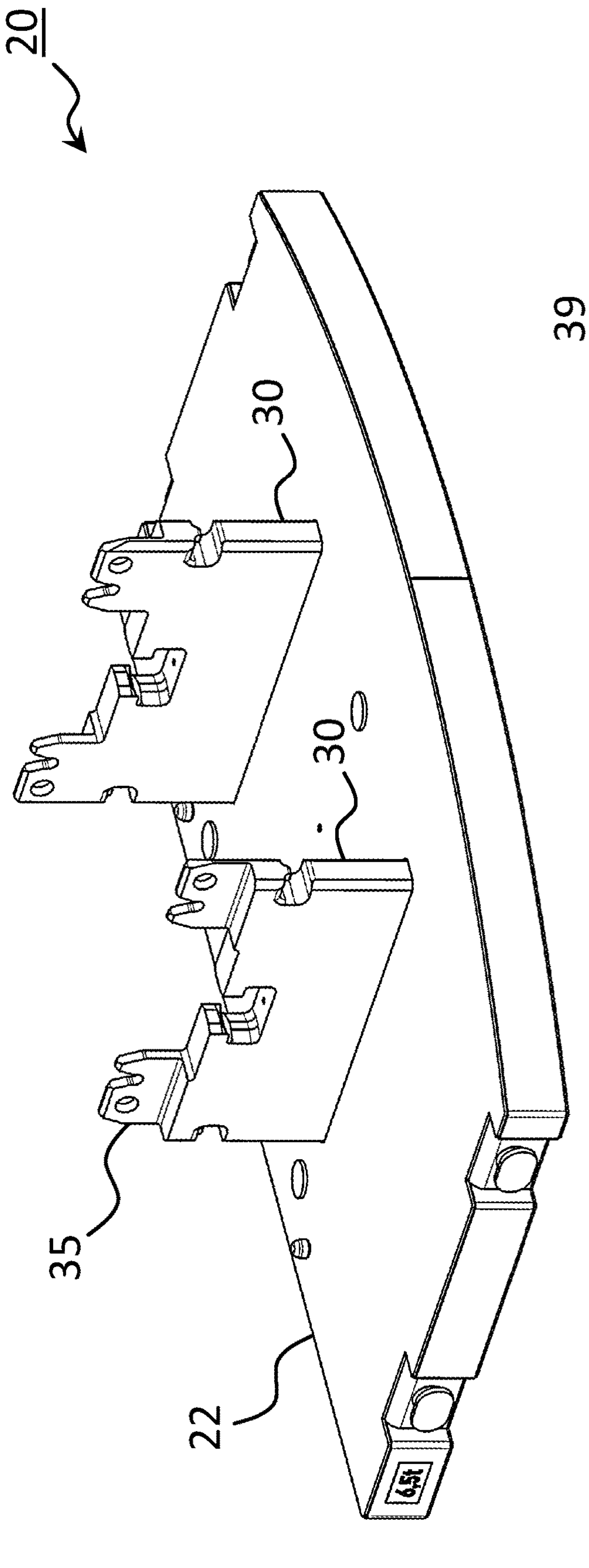
FIG. 10: a second embodiment of the counterweight device in accordance with the disclosure without counterweight elements in a perspective view.
Figure 11:
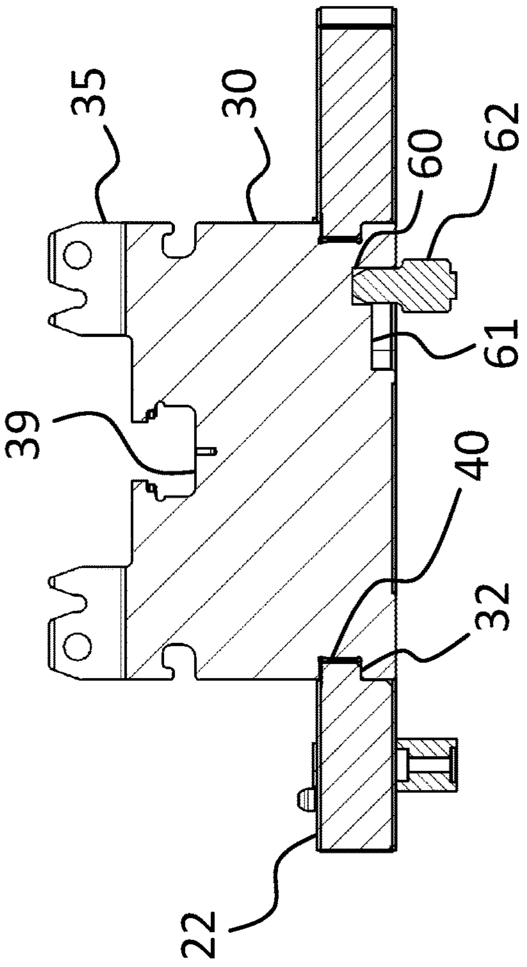
FIG. 11: a section through one of the connection means of the counterweight device in accordance with FIG. 10 along the long side of the connection means in the region of the counterweight base plate.

In FIGS. 10 and 11, a second embodiment of the counterweight device 20 in accordance with the disclosure is shown in a perspective view (FIG. 10) and in a sectional view through one of the connection means 30 along its long side (FIG. 11). Unlike the first embodiment, the connection means 30 are here not displaceably supported in the recess 40 of the counterweight base plate 22 and covered via metal cover plates 42, but are rather fixedly welded to the counterweight base plate 22. The connection here via the above-described solution with the degree of freedom of the base section 50 within the recess 40 is thus not necessary. The weld connection is sufficiently loadable.

As can be recognized in FIG. 11, the cutout 60 acting as a placement centering means is not in the counterweight base plate 22, but rather at the lower side of the connection means 30, i.e. in its base section 50. A bolt 62 pushed into the cutout 60 and acting as a counter-placement centration means 62 of the undercarriage 12 can likewise be recognized. A flatter elongate region 61 is located beside the circular lower region of the cutout 60. On the alignment of the counterweight base plea 22, the introduction chamfer of the bolt 62 is first introduced into the elongate region 61 of the cutout. There is hereby already one degree of freedom fewer present for the correct positioning of the counterweight base plate 22. The bolt 62 is then guided in the elongate region 61 until the deeper region 60 of the cutout has been reached and the counterweight base plate 22 can be let down into its correct position.

REFERENCE NUMERAL LIST

10 mobile crane
12 undercarriage
13 axis of rotation
14 superstructure
16 boom
18 placement device
20 counterweight device
21 ballast frame
22 counterweight base plate
23 ballasting cylinder
24 counterweight element
30 connection means
31 attachment means/recess
32 placement area
34 centering means
35 fastening section
36 fastening means
37 bolt mount
38 coupling region
39 recess
40 recess
41 opening
42 cover (metal cover sheet)
44 screw
45 projection
46 wall
48 cutout
50 base section
52 middle section
54 coupling section
60 placement centering means (cutout)
61 elongate region
62 counter-placement centering means
70 stabilization metal plate
71 opening
72 bolt
80 pivot part
82 central ballast

The invention claimed is:

1. A mobile crane comprising a travelable undercarriage, a superstructure rotatably supported on the undercarriage, and a counterweight device that is couplable with the superstructure and that comprises a counterweight base plate and at least one connection section extending substantially perpendicular to the counterweight base plate and connected thereto for raising the counterweight device and coupling the counterweight device to the superstructure, wherein the at least one connection section comprises the following:

a) a placement area via which the counterweight base plate lies on the connection section and introduces the counterweight base plate's weight force at least in the absence of an inclination of the mobile crane;

b) a centering section by section of which the counterweight device can be positioned in an installation position on the superstructure; and c) a fastening section via which the counterweight device is releasably connectable to the superstructure in the installation position, wherein the counterweight device comprises at least one placement centering section for positioning the counterweight device on a placement region of the undercarriage, with the placement region having at least one corresponding counter-placement centering section that can be brought into engagement with the placement centering section for a correct positioning of the counterweight device on the undercarriage, with the placement centering section being arranged at a lower side of the counterweight base plate and/or of the at least one connection section.

2. A mobile crane in accordance with claim 1, wherein the connection section is formed in one piece.

3. A mobile crane in accordance with claim 2, wherein the connection section is configured as a one-piece sheet metal construction having a substantially flat shape.

4. A mobile crane in accordance with claim 1, wherein the connection section is fixedly connected to the counterweight base plate.

5. A mobile crane in accordance with claim 1, wherein the connection section comprises a base section that is received in a recess of the counterweight base plate; a middle section that projects through an opening of the recess; and a coupling section for coupling with the superstructure, wherein the base section comprises the placement area and has a larger width than the middle section and the opening of the recess.

6. A mobile crane in accordance with claim 5, wherein the recess is open toward a lower side of the counterweight base plate and is closed by a cover connectable to the counterweight base plate, with the recess allowing a movement of the base section in the longitudinal direction of the connection section within the recess that is bounded on one side by an attachment of the placement area to a wall of the recess and on the other side by an attachment of the base section at the cover.

7. A mobile crane in accordance with claim 1, wherein a ballasting device is provided at the superstructure and is configured to raise and place down the counterweight device.

8. A mobile crane in accordance with claim 7, wherein the ballasting device comprises at least one hydraulic ballasting cylinder that can be releasably brought into engagement with a coupling region of the at least one connection section, with the ballasting device furthermore comprising a ballast frame connectable to the superstructure via the fastening section.

9. A mobile crane in accordance with claim 8, wherein the coupling region comprises a recess into which a coupling piece of the ballasting cylinder can be traveled by rotating the superstructure about its axis of rotation, with the coupling piece being lockable in the recess.

10. A mobile crane in accordance with claim 9, wherein the recess is configured such that the coupling piece of the ballasting cylinder can be positioned within the recess beside the coupling region of the connection section and can be traveled into the coupling region by rotating the superstructure, with the recess having an abutment which the coupling piece abuts in a locking position in which the counterweight device can be lifted by the at least one ballasting cylinder.

11. A mobile crane in accordance with claim 7, wherein the superstructure comprises a counter-centering section that is configured to automatically position the counterweight device in an installation position on a raising of the counterweight device by cooperating with the centering section of the connection section, in which installation position the counterweight device is connected to the superstructure, with the centering section comprising a chamfered surface, and/or with the centering section being arranged in the region of the fastening section an end of the connection section disposed opposite the counterweight base plate.

12. A mobile crane in accordance with claim 7, wherein the ballasting device is configured to raise and place down the counterweight device from and onto a placement region of the undercarriage, wherein the connection section has a coupling region via which a coupling with the ballasting device can be established at an end of the connection section disposed opposite the counterweight base plate.

13. A mobile crane in accordance with claim 1, further comprising at least one counterweight element stackable on the counterweight base plate, said counterweight element having at least one recess through which the at least one connection section projects in a placed down state.

14. A mobile crane in accordance with claim 1, wherein the counterweight device comprises at least two mutually spaced apart connection section that are connected to the counterweight base plate and that are arranged at the same distance from the center of gravity of the counterweight base plate.

15. A mobile crane in accordance with claim 1, wherein the fastening section comprises a fastening section having a bolt mount to establish a bolt connection with the superstructure, with the superstructure comprising a stabilization metal sheet that is located below the bolt connection in the bolted state and has an opening through which the fastening section of the connection section can be pushed to establish the bolt connection, with the stabilization metal sheet being configured such that the stabilization metal sheet takes up shear forces in the bolted state on an inclination of the mobile crane.

16. A counterweight device for a mobile crane in accordance with claim 1, further comprising at least one counterweight element that is stackable on the counterweight base plate.

* * * * *